US009690947B2

(12) United States Patent
Bacher et al.

(10) Patent No.: US 9,690,947 B2
(45) Date of Patent: Jun. 27, 2017

(54) PROCESSING A GUEST EVENT IN A HYPERVISOR-CONTROLLED SYSTEM

(71) Applicant: INTERNATIONAL BUSINESS MACHINES CORPORATION, Armonk, NY (US)

(72) Inventors: Utz Bacher, Boeblingen (DE); Reinhard Buendgen, Boeblingen (DE); Einar Lueck, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/899,166

(22) PCT Filed: Mar. 14, 2014

(86) PCT No.: PCT/IB2014/059780
§ 371 (c)(1),
(2) Date: Dec. 17, 2015

(87) PCT Pub. No.: WO2014/207581
PCT Pub. Date: Dec. 31, 2014

(65) Prior Publication Data
US 2016/0148001 A1    May 26, 2016

(30) Foreign Application Priority Data

Jun. 27, 2013 (GB) .................................. 1311430.1

(51) Int. Cl.
*G06F 21/60* (2013.01)
*G06F 9/455* (2006.01)
(Continued)

(52) U.S. Cl.
CPC ........ *G06F 21/602* (2013.01); *G06F 9/45558* (2013.01); *G06F 9/542* (2013.01); *G06F 21/57* (2013.01); *G06F 2009/45587* (2013.01)

(58) Field of Classification Search
CPC .... G06F 9/45558; G06F 21/602; G06F 9/542; G06F 21/57; G06F 2009/45587
(Continued)

(56) References Cited

U.S. PATENT DOCUMENTS 5,371,867 A    12/1994  George et al.
5,404,563 A *   4/1995  Green ................... G06F 9/4881
                                                    700/79
(Continued)

FOREIGN PATENT DOCUMENTS

CN    101179379 A    5/2008
CN    101470783 A    7/2009

OTHER PUBLICATIONS

International Search Report for PCT/IB2014/059780 dated Dec. 1, 2014.
(Continued)

*Primary Examiner* — Haresh N Patel
(74) *Attorney, Agent, or Firm* — William A. Kinnaman, Esq.; Kevin P. Radigan, Esq.; Heslin Rothenberg Farley & Mesiti P.C.

(57) ABSTRACT

Method of processing a guest event in a hypervisor-controlled system, which includes: triggering a first firmware service specific for the guest event; the firmware processing information associated with the guest event, and presenting only a subset of the information of a guest state and memory in decrypted form to a hypervisor, where the subset of the information is selected to allow the hypervisor to process the guest event; the firmware retaining a part of the information of the guest state and memory not sent to the hypervisor; the
(Continued)

hypervisor processing the guest event based on the received subset of the information, and sending a process result to the firmware, triggering a second firmware service; the firmware processing the received process result together with the part of the information of the guest state and memory not sent to the hypervisor, and generates and performs a state and/or memory modification.

20 Claims, 6 Drawing Sheets

(51) Int. Cl.
    *G06F 21/57*    (2013.01)
    *G06F 9/54*    (2006.01)

(58) Field of Classification Search
    USPC .......................................... 713/163, 189, 193
    See application file for complete search history.

(56) References Cited

U.S. PATENT DOCUMENTS

| | | | |
|---|---|---|---|
| 8,127,292 B1 | 2/2012 | Dobrovolskiy et al. | |
| 8,156,298 B1* | 4/2012 | Stubblefield | G06F 12/1433 711/163 |
| 8,538,919 B1* | 9/2013 | Nielsen | G06F 9/5077 380/277 |
| 8,966,315 B2* | 2/2015 | Burn | G06F 11/1446 711/173 |
| 9,503,268 B2* | 11/2016 | Brandwine | H04L 9/3263 713/155 |
| 2006/0259732 A1* | 11/2006 | Traut | G06F 12/109 711/173 |
| 2007/0011486 A1 | 1/2007 | Li et al. | |
| 2008/0059556 A1* | 3/2008 | Greenspan | G06F 9/5077 709/201 |
| 2008/0133875 A1* | 6/2008 | Cohen | G06F 12/1027 711/207 |
| 2008/0155168 A1* | 6/2008 | Sheu | G06F 12/1027 711/6 |
| 2008/0178171 A1 | 7/2008 | Sueyoshi et al. | |
| 2008/0288238 A1* | 11/2008 | Heller, Jr. | G06F 9/45504 703/28 |
| 2009/0083736 A1 | 3/2009 | Goto | |
| 2009/0113110 A1 | 4/2009 | Chen et al. | |
| 2009/0172298 A1* | 7/2009 | Yoon | G06F 9/45537 711/144 |
| 2009/0282266 A1* | 11/2009 | Fries | G06F 21/602 713/193 |
| 2010/0037096 A1* | 2/2010 | Bum | G06F 11/1438 714/19 |
| 2010/0146267 A1* | 6/2010 | Konetski | G06F 21/53 713/164 |
| 2010/0281273 A1* | 11/2010 | Lee | G06F 21/72 713/190 |
| 2010/0299667 A1* | 11/2010 | Ahmad | G06F 12/1018 718/1 |
| 2011/0041126 A1* | 2/2011 | Levy | G06F 9/5072 718/1 |
| 2011/0202765 A1* | 8/2011 | McGrane | G06F 21/53 713/168 |
| 2011/0202916 A1* | 8/2011 | VoBa | G06F 21/62 718/1 |
| 2011/0202919 A1* | 8/2011 | Hayakawa | G06F 9/45558 718/1 |
| 2011/0231614 A1* | 9/2011 | Spracklen | G06F 9/45533 711/141 |
| 2011/0246986 A1* | 10/2011 | Nicholas | G06F 11/0712 718/1 |
| 2011/0271152 A1* | 11/2011 | Hattori | G06F 11/079 714/53 |
| 2011/0271279 A1* | 11/2011 | Pate | G06F 21/53 718/1 |
| 2012/0079164 A1* | 3/2012 | Hakewill | G06F 12/109 711/6 |
| 2013/0086550 A1* | 4/2013 | Epstein | G06F 12/1475 717/110 |
| 2013/0132690 A1* | 5/2013 | Epstein | G06F 12/1416 711/159 |
| 2013/0159639 A1* | 6/2013 | Corrie | G06F 12/00 711/154 |
| 2013/0160013 A1* | 6/2013 | Pires | G06F 21/41 718/1 |
| 2013/0179651 A1* | 7/2013 | Shatz | G06F 9/45558 711/162 |
| 2013/0276056 A1* | 10/2013 | Epstein | G06F 21/604 726/1 |
| 2013/0290596 A1* | 10/2013 | Corrie | G06F 12/023 711/6 |
| 2013/0318594 A1* | 11/2013 | Hoy | H04L 63/0272 726/15 |
| 2014/0032753 A1* | 1/2014 | Watanabe | H04L 29/08549 709/224 |
| 2014/0208096 A1* | 7/2014 | Brandwine | H04L 9/3263 713/156 |
| 2014/0282508 A1* | 9/2014 | Plondke | G06F 9/45533 718/1 |
| 2014/0297941 A1* | 10/2014 | Rajani | G06F 3/0644 711/114 |
| 2015/0363220 A1* | 12/2015 | Yamada | G06F 13/10 711/114 |

OTHER PUBLICATIONS

Bacher et al., Search Report for GB1311430.1, dated Dec. 20, 2013, (3 Pages).

* cited by examiner

PROCESSING A GUEST EVENT IN A HYPERVISOR-CONTROLLED SYSTEM

BACKGROUND

The present invention relates in general to data processing systems, and in particular, to a method and a system for processing a guest event in a hypervisor-controlled system.

Customer adoption of public Clouds is limited to non-mission critical data. Very often, the core business data is an essential asset to a customer, and the data's confidentiality is critical for business success. As long as customers do not trust Cloud environments, Cloud adoption of those business sensitive environments will remain minimal. Among the main concerns of customers are lack of trust in the Cloud provider and the security of the Cloud.

Trust in the Cloud provider is critical since an administrator of the provider has the capability to fully inspect the customer's workload and data. This potential breach for espionage is the reason for being reluctant for many customers.

Trust in Cloud security relates to the threat of a hypervisor breach, that is, if an attacker gains access to the hypervisor, the customer's workload and data are at risk again.

Approaches to guarantee confidentiality and privacy are limited to input/output (I/O) at this time: network encryption like secure sockets layer (SSL) can be used to encrypt socket connections and disk encryption tools like dm-crypt in LINUX can be used to encrypt data on a disk device.

A trusted platform module (TPM) has been developed to ensure the boot chain is valid at the time the customer runs its workload, yet it is not deployed in a Cloud environment. Also, TPMs do not ensure privacy, but rather, integrity of the setup at best.

All these technologies, even if used, do not address the issue that a hypervisor can always fully inspect its guests, where guests may in general be virtual machines on a hypervisor-controlled system, and read memory contents with potentially sensitive data of the image running in the guest. The concerns mentioned above cannot be eliminated by these technologies.

US 2011/0302400 A1 describes a method that generally includes receiving, by a trust anchor on a central processing unit (CPU) having a plurality of processing cores, a virtual machine (VM) image. As received, the VM image is encrypted using a VM image encryption key. The method also includes obtaining the VM image encryption key and configuring a first encrypt/ decrypt block with the VM image encryption key. The method also includes generating a memory session key and configuring a second encrypt/ decrypt block with the memory session key. The method also includes fetching one or more pages of the VM image into a memory accessible by the plurality of processing cores. Each fetched page is decrypted by the first encrypt/ decrypt block using the VM image encryption key and subsequently encrypted by the second encrypt/decrypt block using the memory session key.

SUMMARY

In one or more aspects, a method of processing a guest event in a hypervisor-controlled system is provided. The method includes: triggering, based on the guest event, a first firmware service, the first firmware service being specific for the guest event in a firmware, the guest event being associated with a guest and with a guest state and a guest memory encrypted with a guest key; processing, by the firmware, information associated with the guest event, the information comprising information of the guest state and the guest memory, and presenting only a subset of the information of the guest state and the guest memory in decrypted form to a hypervisor, wherein the subset of the information is selected to suffice for the hypervisor to process the guest event; retaining, by the firmware, a part of the information of the guest state and the guest memory that is not being sent to the hypervisor; processing, by the hypervisor, the guest event based on the received subset of the information of the guest state and the guest memory and sending a process result to the firmware, triggering a second firmware service, the second firmware service being specific for the guest event; processing, by the firmware, the received process result together with the part of the information of the guest state and the guest memory that was not sent to the hypervisor, to generate a state and/or memory modification; and performing, by the firmware, the state and/or memory modification associated with the guest event at the guest memory in encrypted form.

In one or more other aspects, a system for processing a guest event in a hypervisor-controlled system is provided. The system includes a memory, and a processor communicatively coupled to the memory, wherein the system performs a method including: triggering, based on the guest event, a first firmware service, the first firmware service being specific for the guest event in a firmware, the guest event being associated with a guest and with a guest state and a guest memory encrypted with a guest key; processing, by the firmware, information associated with the guest event, the information comprising information of the guest state and the guest memory, and presenting only a subset of the information of the guest state and the guest memory in decrypted form to a hypervisor, wherein the subset of the information is selected to suffice for the hypervisor to process the guest event; retaining, by the firmware, a part of the information of the guest state and the guest memory that is not being sent to the hypervisor; processing, by the hypervisor, the guest event based on the received subset of the information of the guest state and the guest memory and sending a process result to the firmware, triggering a second firmware service, the second firmware service being specific for the guest event; processing, by the firmware, the received process result together with the part of the information of the guest state and the guest memory that was not sent to the hypervisor, to generate a state and/or memory modification; and performing, by the firmware, the state and/or memory modification associated with the guest event at the guest memory in encrypted form.

In one or more further aspects, a computer program product is provided for processing a guest event in a hypervisor-controlled system. The computer program product includes a computer-readable storage medium having program instructions embodied therewith, the program instructions being executable by a processor to cause the processor to perform a method comprising: triggering, based on the guest event, a first firmware service, the first firmware service being specific for the guest event in a firmware, the guest event being associated with a guest and with a guest state and a guest memory encrypted with a guest key; processing, by the firmware, information associated with the guest event, the information comprising information of the guest state and the guest memory, and presenting only a subset of the information of the guest state and the guest memory in decrypted form to a hypervisor, wherein the subset of the information is selected to suffice for the hypervisor to process the guest event; retaining, by the firmware, a part of the information of the guest state and the guest memory that is not being sent to the hypervisor; processing, by the hypervisor, the guest event based on the received subset of the information of the guest state and the guest memory and sending a process result to the firmware, triggering a second firmware service, the second firmware service being specific for the guest event; processing, by the firmware, the received process result together with the part of the information of the guest state and the guest memory that was not sent to the hypervisor to generate a state and/or memory modification; and performing, by the firmware, the state and/or memory modification associated with the guest event at the guest memory in encrypted form.

BRIEF DESCRIPTION OF THE DRAWINGS

The present invention together with the above-mentioned and other objects and advantages may best be understood from the following detailed description of the embodiments, but not restricted to the embodiments, wherein is shown in.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1:
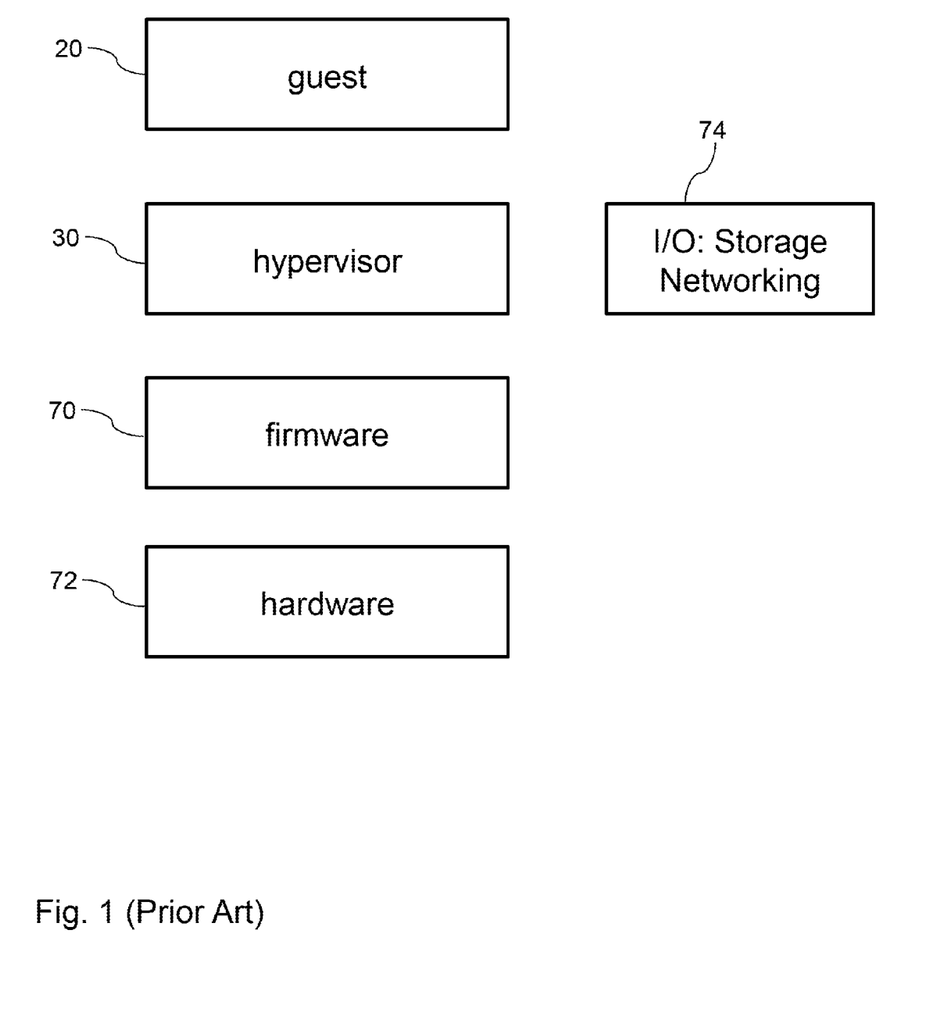
FIG. 1 a stack of components in a hypervisor-controlled system according to prior art.

FIG. 1 shows a stack of components in a hypervisor-controlled system according to prior art. The different components comprise one or more guests 20, realized as a virtual machine, running on a hypervisor-controlled system as a virtual server system, consisting of firmware 70, hardware 72, as e.g. one or more CPUs, memory, I/O devices 74 for storage networking. A hypervisor 30 manages the resources of the hardware 72 and I/O devices 74 and allocates appropriate portions of these resources to the guests 20. In a Cloud environment the guest VM 20 is operated by a client or customer, whereas the hypervisor 30 is operated by a Cloud provider, who may be untrusted by the client. The firmware 70, as well as the hardware 72, are manufactured by a hardware vendor, who may be considered as trusted. It is an objective of the invention to provide a method for securely processing the guest VM 20 in a Cloud environment where the Cloud provider may not be trusted.

Figure 2:
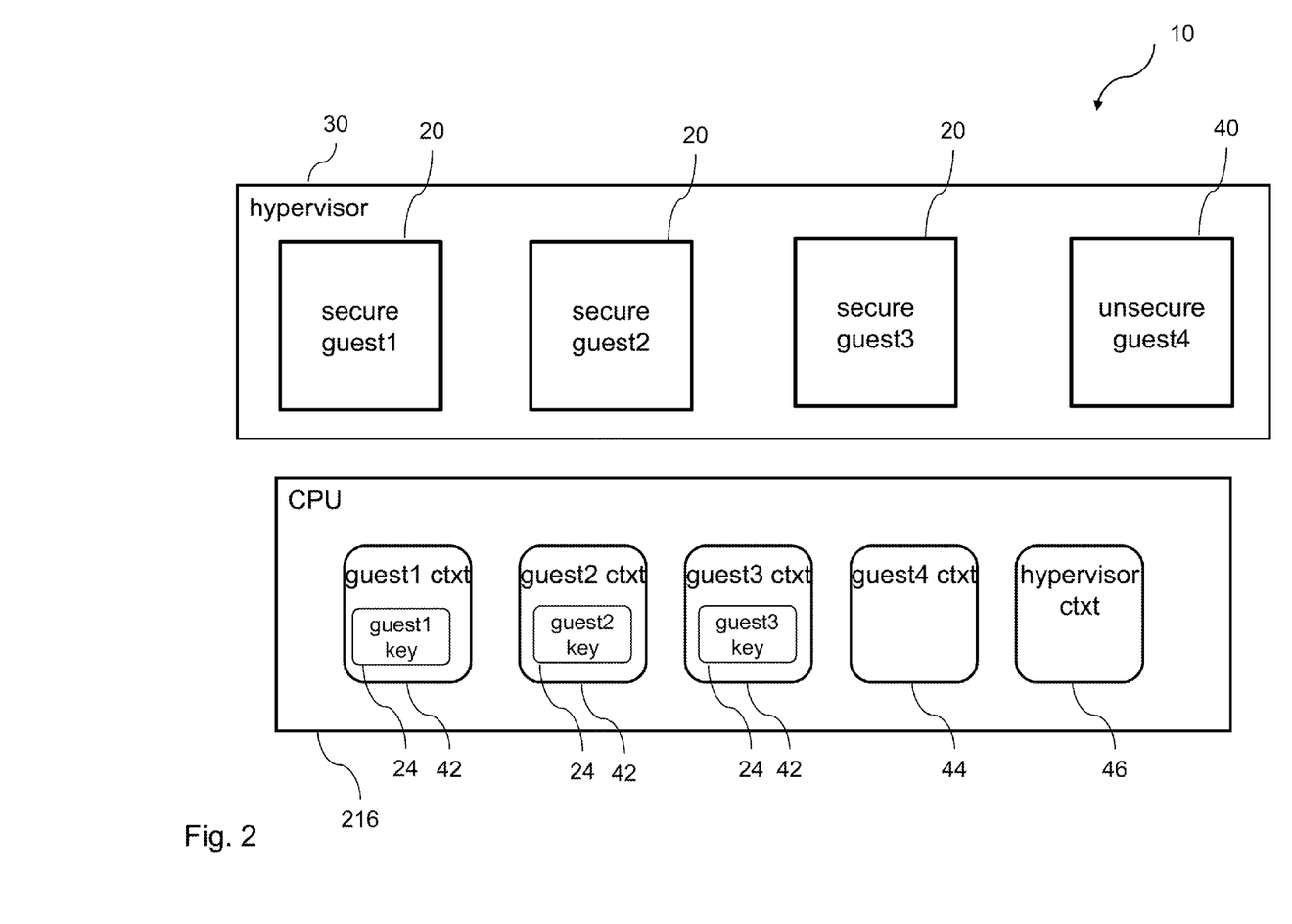
FIG. 2 a general overview of a method for a secure execution of guests in an insecure environment, according to one or more aspects of the present invention.
Figure 3:
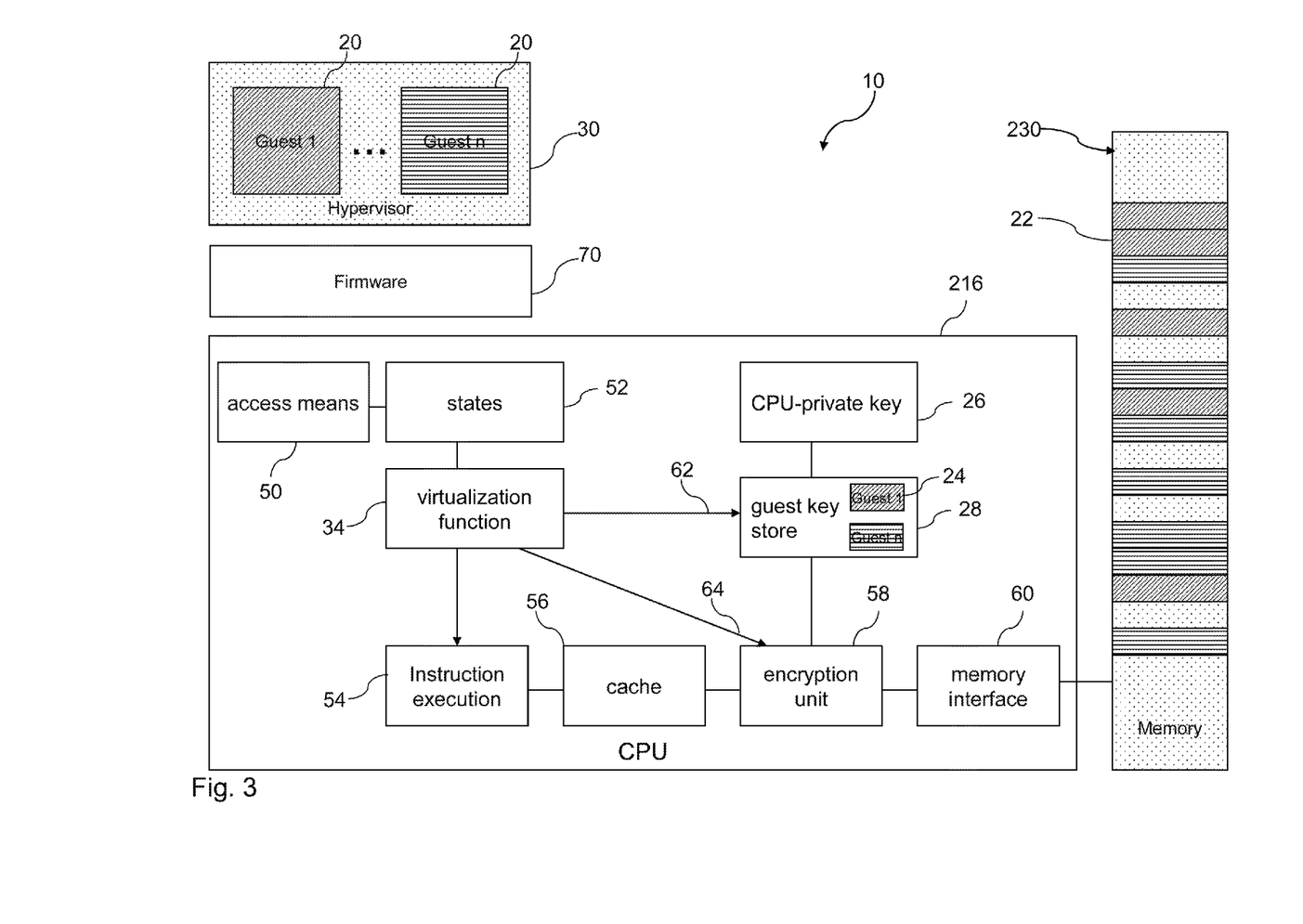
FIG. 3 a system diagram of a hypervisor-controlled system for a secure execution of guests in an insecure environment, according to one or more aspects of the present invention.

Summarizing one or more aspects of the present invention with reference to FIGS. 2 and 3, a method according to the present invention for processing a guest event in a hypervisor-controlled system 10 may include: (i) the guest event triggering a first firmware service being specific for the guest event in a firmware 70, the guest event being associated with a guest 20 and with a guest state 52 and a guest memory 22 encrypted with a guest key 24; (ii) the firmware 70 processing information associated with the guest event, comprising information of the guest state 52 and the guest memory 22, and presenting only a subset of the information of the guest state 52 and the guest memory 22 in decrypted form to a hypervisor 30, wherein the subset of the information is selected to suffice for the hypervisor 30 to process the guest event; (iii) the firmware 70 retaining a part of the information of the guest state 52 and the guest memory 22 that was not being sent to the hypervisor 30; (iv) the hypervisor 30 processing the guest event based on the received subset of the information of the guest state 52 and the guest memory 22 and sending a process result to the firmware 70 triggering a second firmware service being specific for the guest event; (v) the firmware 70 processing the received process result together with the part of the information of the guest state and the guest memory that was not sent to the hypervisor 30, generating a state and/or memory modification; (vi) the firmware 70 performing the state and/or memory modification associated with the guest event at the guest memory 22 in encrypted form. These steps are referenced in the description of the embodiments discussed below.

In one embodiment, the first firmware service may favorably comprise at least one of the steps (ii) and (iii) of the description above, wherein in step (ii), the firmware 70 processing information associated with the guest event, comprising information of the guest state 52 and the guest memory 22, and presenting only a subset of the information of the guest state 52 and the guest memory 22 in decrypted form to a hypervisor 30, wherein the subset of information is selected to suffice for the hypervisor 30 to process the guest event. Step (iii) comprises the firmware 70 retaining a part of the information of the guest state 52 and the guest memory 22 that was not being sent to the hypervisor 30.

In one embodiment, the second firmware service may favorably comprise at least one of the steps (v) and (vi) of the description above, wherein step (v) comprises the firmware 70 processing the received process result together with the part of the information of the guest state and the guest memory that was not sent to the hypervisor 30, generating a state and/or memory modification; and wherein in step (vi) the firmware 70 performing the state and/or memory modification associated with the guest event at the guest memory 22 in encrypted form.

FIG. 2 gives a general overview of a method for a secure execution of guests 20 in an insecure environment of a hypervisor-controlled system 10 according to an embodiment of the invention. This may be achieved in analogy to a secure socket layer, where secure operation (i.e. messaging) is also achieved over an unsecure medium. A hypervisor 30, which is considered as untrusted, may control secure guests 20 as well as unsecure guests 40 at the same time and in the same system. The CPU 216 that runs the hypervisor 30 and the guests 20, 40 maintains a specific context 42 for each secure guest 20, a specific context 44 for each unsecure guest 40 and a context 46 for the hypervisor 30 respectively. Each context 42 of a secure guest 20 may contain a guest key 24 associated with the secure guest 20. The memory of each secure guest 20 is encrypted with the guest key 24 of the according secure guest 20. These guests, 20, 40 as well as the hypervisor 30 may run on a CPU 216 in their own contexts 42, 44, 46. Also, on the CPU 216 there is the hypervisor 30 running in its own context 46. When a CPU 216 runs in one context it has no access to information maintained by another context. When a CPU 216 runs in a guest context 42 of a secure guest 20 it has access to the guest key 24 of that guest 20 to encrypt and decrypt data of that guest 20. Further a CPU 216 enters a context of a guest 20, 40 or a hypervisor 30 only if it processes code of that guest 20, 40 or that hypervisor 30 respectively.

FIG. 3 shows a system diagram of a hypervisor-controlled system 10 for a secure execution of guests 20 in an insecure environment according to an embodiment of the invention. Numerals referenced in the following description which are not shown in FIG. 3, reference objects of FIGS. 1 and 2.

First generic functions of an encrypted execution of guests 20 in an insecure environment according to an embodiment of the invention will be explained using the diagram in FIG. 3, before the behavior of the hypervisor-controlled system for handling interrupts or interceptions due to a guest event will be discussed.

The diagram in FIG. 3 shows one or more guests 20, named guest 1 to guest n, controlled by a hypervisor 30, all components running on a CPU 216, which is connected to a memory 230. The CPU 216 comprises access means 50 for a state of guest context of the CPU's virtualization function 34, where the access is controlled based on the context the CPU 216 is in. These access means 50 may read a guest state 52 and/or a virtual CPU state from a store of guest states 52, containing a context information and/or control blocks which may be hidden from the hypervisor 30. The store of guest states 52 contains a guest state 52 from the execution of the virtualization function 34. The instruction execution unit 54 fetches code from the memory 230 into the cache 56 and executes that code. As a result the memory fetches and stores, executed by the instruction execution unit 54, may be triggered. When these memory fetch and store requests are handled by the cache 56, data, involved in these fetch and store requests, is present in clear text. To enable the memory fetches to reach out to the encrypted guest memory area 22 in the memory 230, data will be decrypted on the transfer into the cache 56 by the encryption unit 58 when the virtualization function 34 is running in the context of the corresponding guest 20 using the guest key 24. When cache lines are pushed out into the memory 230, the encryption unit 58 will encrypt the cache lines on the transfer out to the memory 230 using the guest key 24 of the corresponding guest 20 that is currently executed by the virtualization function 34.

The encryption unit 58 is located between the cache 56 and the memory interface 60 of the CPU 216 which connects to the memory 230. The virtualization function 34 controls 64 the encryption unit 58 and provides it with the cryptographic guest key 24 of a secure guest 20 from the guest key store 28 if the CPU 216 runs in the context of that secure guest 20. The CPU 216 has got a private key 26 for decrypting encrypted guest keys 24, which are stored in the key store 28 and fed to the encryption unit 58. The guest key store 28 may contain encrypted guest keys 24 for transmission to the CPU 216 as well as decrypted guest keys for instruction execution. The cache 56 may contain clear text data, however processes, which are not running in a guest context, may not access this clear text data. The cache 56 therefore may associate data with the context of the guest 20 the data belongs to. The memory 230 may contain encrypted guest memory areas 22 as well as clear text areas for communicating guest data via I/O with an outside system as well as memory areas belonging to the hypervisor 30 and unsecure guests.

The hypervisor 30 has only limited access to data and/or code in the memory 230, because there exist ranges which are encrypted with a guest key 24 and other ranges which are visible to the hypervisor 30.

Following, the realization of the handling of interruptions or interceptions by means of firmware services as services implemented in the firmware 70 according to one or more aspects of the present invention is explained. In a short description, processing a guest event in a hypervisor-controlled system 10 may include: (i) triggering a first firmware service; (ii) the firmware 70 processing information associated with the guest event, presenting only a subset of the information in decrypted form to a hypervisor 30; (iii) the firmware retaining a part of the information that is not being sent to the hypervisor 30; (iv) the hypervisor 30 triggering a second firmware service; (v) the firmware generating a guest state 52 and/or guest memory 22 modification; (vi) the firmware performing the guest state 52 and/or guest memory 22 modification.

Concrete features of this generic approach are described hereafter in more details.

In case an interruption or an instruction interception, associated with a guest 20 and with a guest state 52 and a guest memory 22 encrypted with a guest key 24 occurs, first and second firmware services associated with that interruption or instruction interception will have access to the guest state 52, the guest memory 22 both encrypted with the guest key 24 and decrypted in the cache 56, and the (unencrypted) hypervisor memory. Both services are capable of reading the guest memory 22 of the guest 20 by having this memory 22 transferred to the cache 56 thereby having the memory 22 decrypted using the guest key 24. The firmware services may transfer unencrypted data from the cache 56 to memory private to the firmware service or to the hypervisor 30. The second firmware service is capable of transferring unencrypted data from its private memory or the hypervisor memory into a cache region associated with encrypted guest memory 22 and then transferring the contents of that cache region to the encrypted guest memory 22 while encrypting the contents of the cache region using the guest key 24.

A virtualized environment of a CPU 216 is extended decrypting or encrypting the guest memory 22 by the CPU 216, if the CPU 216 runs in guest 20 context; allowing the guest 20 to communicate externally through a non-encrypted memory range; paging encrypted pages of the guest memory 22 by the hypervisor 30.

A secure deployment and execution of a guest 20 comprises providing the guest 20 with the guest key 24, encrypted with the public key 32 associated with a private key 26 of the CPU 216 for transfer to the key store 28 of the CPU 216; providing the CPU 216 with the private key 26, stored in the CPU 216 and being used to decrypt the encrypted guest key 24; the guest key 24 being used to encrypt and decrypt the guest memory 22 while running guest or firmware code in guest 20 context by the CPU 216.

A boot image generation and deployment process covers generating a boot image by a client or customer for the guest 20; encrypting the boot image with the guest key 24; transferring the encrypted boot image to a boot disk; loading the encrypted boot image of a guest 20 by the hypervisor 30 to the guest memory 22; starting an execution of a guest 20 as a virtual machine at the CPU 216 level.

A boot process of the boot image comprises a thread of execution in the virtual machine executing on the guest memory 22 being decrypted to clear text while the CPU 216 is in guest 20 context; the guest memory 22 being decrypted while the CPU 216 is in guest 20 context, and the guest state 52, both, the guest memory 22 and the guest state 52 being protected from access by the hypervisor 30 or other guests.

Further execution of a guest 20 comprises extending a virtualization function 34 of the CPU 216 to encrypt the guest memory 22 when the encrypted area of the guest memory 22 is written to in guest 20 context; decrypting the guest memory 22 when the encrypted area of a guest memory 22 is read from in guest 20 context; the encrypted area of the guest memory 22 and guest registers being accessible to the hypervisor 30 only in encrypted form.

An interaction between the guest 20 and the hypervisor 30 further covers the encrypted range of the guest memory 22 or registers associated with the guest event being not accessible to the hypervisor 30 in decrypted form; extending the virtualization function 34 of the CPU 216 by access methods to specific guest data associated with the guest event.

An I/O process of a guest 20 further comprises defining a non-encrypted memory area for I/O buffers and I/O control structures of the guest 20 outside the encrypted area of the guest memory 22; starting the I/O process by the guest 20 using that non-encrypted area of the guest memory 22; the virtualization function 34 of the CPU 216 generating a guest event; the hypervisor 30 reading a reason for the guest event and performing the I/O process.

A paging process further is characterized by paging-out pages of the guest memory 22 by the hypervisor 30; upon attempting access to a paged-out page, providing a page fault that indicates to the hypervisor 30 whether a page-out operation of the hypervisor 30 caused that page fault; triggering the hypervisor 30 to perform a page-in process to the guest memory 22.

Further checking a guest integrity with a checking process, the checking process comprises the steps: the checking process knowing the guest key 24; the guest 20 reading a memory content in clear text from the guest memory 22 transferring an arbitrary range of the guest memory 22 via a secure communication path to the checking process; requesting the same memory range of the guest memory 22 from the hypervisor 30 and transferring it to the checking process; comparing the memory content obtained from the guest 20 with the result of decrypting the memory content obtained from the hypervisor 30; delivering a comparison result depending on the contents of the two memory ranges; the result of the checking process being positive if the comparison result equals zero, otherwise being negative.

Figure 4:
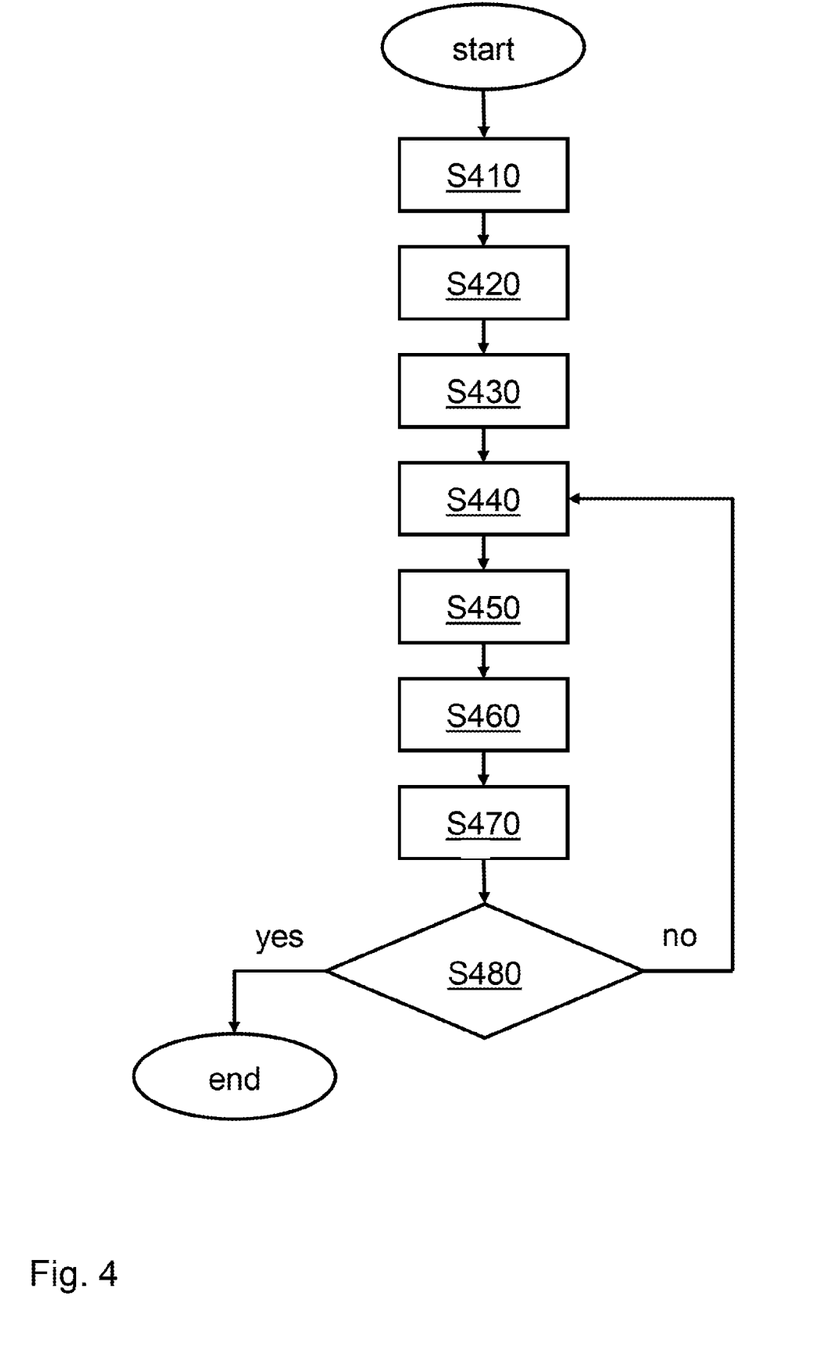
FIG. 4 a generic flow chart for running an encrypted guest, according to one or more aspects of the present invention.

In FIG. 4 a generic flow chart for executing an encrypted guest running according to one or more aspects of the present invention from a hypervisor 30 and CPU 216 view is shown. FIG. 4 as well as FIG. 5 reference in the flowcharts objects defined in the diagrams of FIGS. 2 and 3, so the reference numerals used also are referencing the objects of these Figures. Running an encrypted guest 20 starts with step S410, where the hypervisor 30 reads an encrypted guest image from an initial program loader (IPL) device together with an encrypted guest key 24. Next, in step S420, the hypervisor 30 stores the encrypted guest image into the guest memory 22. In step S430 the hypervisor 30 prepares an initial guest state 52 that includes the encrypted guest key 24. Thus the steps S410 to S430 serve for initializing a guest 20 in a hypervisor-controlled system 10. In step S440, a secure guest 20 virtual machine is started according to the current guest state 52. Following in step S450, a CPU 216 runs the secure guest 20 in a secure guest context 42 as described by the current guest state 52. In step S460, if a guest event in the form of an interrupt or an instruction interception occurs, the guest 20 exits the guest context 42 with an updated guest state 52 due to this interrupt or interception. The hypervisor 30 is now able in step S470, to handle the interrupt or interception using a first firmware service to read data from the secure guest 20 or a second firmware service to write data to the secure guest 20.

Generally, a first firmware service may be triggered, meaning that (ii) the firmware 70 is processing information associated with the guest event and presenting only a subset of the information of the guest state 52 and the guest memory 22 in decrypted form to the hypervisor 30, and (iii) the firmware 70 is retaining a part of the information that is not being sent to the hypervisor 30. Further, (iv) based on the received subset of the information, the hypervisor 30 may be triggering a second firmware service for (v) generating a state and/or memory modification of the guest 20, and for (vi) performing the state and/or memory modification associated with the guest event at the guest memory 22 in encrypted form.

If the secure guest 20 is finished, at branch S480 the whole process comes to an end. If the secure guest 20 is not finished, a loop to step S440 is closed and the hypervisor 30 is starting the secure guest 20 again.

Figure 5:
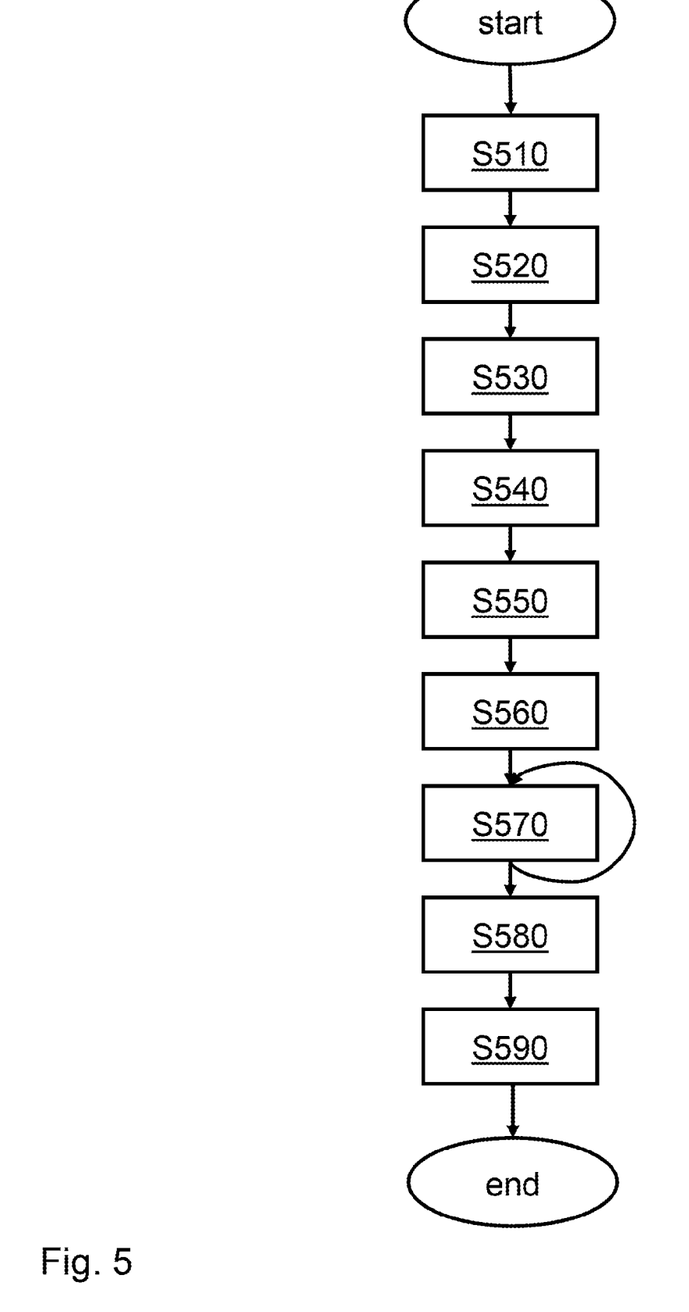
FIG. 5 a detailed flow chart for interception handling with an encrypted guest running, according to one or more aspects of the present invention.

In FIG. 5 a detailed flow chart for interception handling with an encrypted guest running according to an embodiment of the invention is depicted. Step S510 starts with a guest event, meaning that the secure guest 20 is issuing an instruction which requests interpretation or support by the hypervisor 30, e.g., an instruction to store system environment parameters, which is usually provided by the hypervisor 30. In a next step S520, where execution of the virtualization function 34 leaves the guest context 42 and passes initiative to a CPU-internal virtualization code. Then in step S530 the CPU-internal virtualization code detects a reason for exit of the guest 20, e.g., identifies instruction to store system environment parameters. In step S540, the CPU-internal virtualization code prepares handles for the hypervisor 30 to access input and output parameters, according to the reason for exit of the guest 20, e.g., associates the storage location for the requested information with a handle. Then in step S550, the CPU-internal virtualization code masks the part of the execution state not needed to process the interception and returns the initiative to the hypervisor 30, indicating the exit of the guest 20 and a hint to input and output parameter handles, e.g., hides registers and context data from the hypervisor 30, e.g. by encrypting them. The CPU-internal virtualization code in steps S520 to S550 can alternatively be implemented as a first firmware service. Next, in step S560, the hypervisor 30 detects the reason for the exit of the guest 20 by reading the reason indication from the CPU-internal virtualization code, e.g., reads a reason code to identify a virtual server's request to store system environment parameters. The hypervisor 30 triggers in step S570 (if necessary, repeatedly) firmware services (e.g. the first firmware service) to work with input and output parameters to process the exit of the guest 20. To perform this, the hypervisor 30 uses previously established handles as means to reference contents of the memory 230 and registers required for processing, e.g., the hypervisor 30 stores system environment parameters into the virtual server's memory through firmware services (e.g. the second firmware service) using the received handle.

By this way, in the detailed flow chart for interception handling with an encrypted guest in FIG. 5 it is described how first and second firmware services are used for processing a guest event in a hypervisor-controlled system 10, how (ii) the firmware 70 is processing information associated with the guest event and presenting only a subset of the information in decrypted form to the hypervisor 30, as well as (iii) the firmware 70 is retaining a part of the information and (iv) based on the received subset of the information the second firmware service may be triggered.

Next, in step S580, the hypervisor 30 restarts virtualization function 34 execution by issuing an according CPU instruction, until in step S590, the CPU-internal virtualization code clears handles from the previous exit of the guest 20, unmasks the virtual server context for the virtualization function 34 execution and starts execution of the virtual server.

Thus a state and/or memory modification of the guest 20 may be generated and performed at the guest memory 22 in encrypted form.

Figure 6:
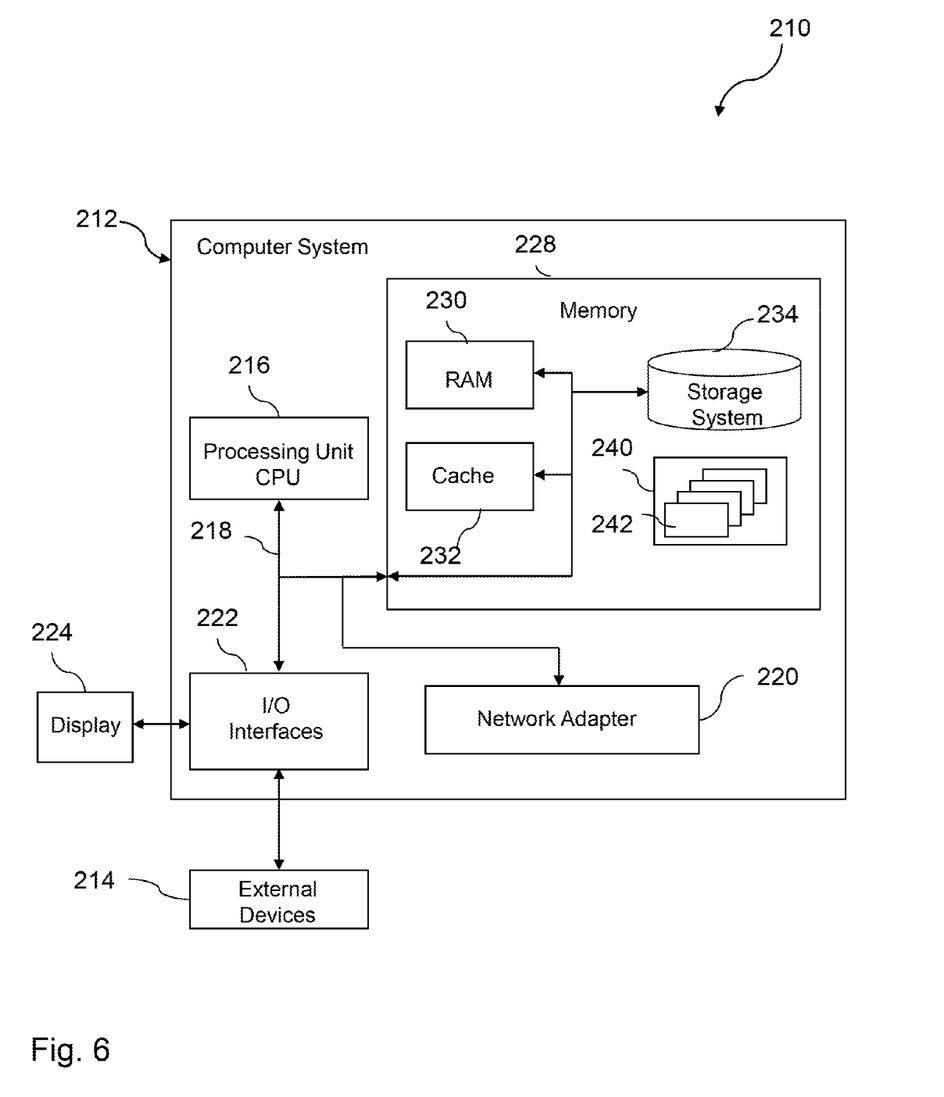
FIG. 6 an example embodiment of a data processing system for carrying out a method, according to one or more aspects of the present invention.

Referring now to FIG. 6, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

Those skilled in the art will note from the above description that it is an objective of one or more aspects of the present invention to provide a method for securely processing guest data in an untrusted Cloud environment. Another objective is to provide a system for securely processing guest data in an untrusted Cloud environment.

These objectives are achieved by the features of the independent claims. The other claims, the drawings and the specification disclose advantageous embodiments of the invention.

According to one aspect of the invention, a method is provided for processing a guest event in a hypervisor-controlled system, comprising the steps: (i) the guest event triggering a first firmware service being specific for the guest event in a firmware, the guest event being associated with a guest and with a guest state and a guest memory encrypted with a guest key; (ii) the firmware processing information associated with the guest event, comprising information of the guest state and the guest memory, and presenting only a subset of the information of the guest state and the guest memory in decrypted form to a hypervisor, wherein the subset of the information is selected to suffice for the hypervisor to process the guest event; (iii) the firmware retaining a part of the information of the guest state and the guest memory that is not being sent to the hypervisor; (iv) the hypervisor processing the guest event based on the received subset of the information of the guest state and the guest memory and sending a process result to the firmware triggering a second firmware service being specific for the guest event; (v) the firmware processing the received process result together with the part of the information of the guest state and the guest memory that was not sent to the hypervisor, generating a state and/or memory modification; (vi) the firmware performing the state and/or memory modification associated with the guest event at the guest memory in encrypted form.

The first firmware service may favorably include steps (ii) and (iii), namely (ii) the firmware processing information associated with the guest event, comprising information of the guest state and the guest memory, and presenting only a subset of the information of the guest state and the guest memory in decrypted form to a hypervisor, wherein the subset of information is selected to suffice for the hypervisor to process the guest event; and (iii) the firmware retaining a part of the information of the guest state and the guest memory that was not being sent to the hypervisor.

The second firmware service may favorably include steps (v) and (vi), namely (v) the firmware processing the received process result together with the part of the information of the guest state and the guest memory that was not sent to the hypervisor, generating a state and/or memory modification; and (vi) the firmware performing the state and/or memory modification associated with the guest event at the guest memory in encrypted form.

In one or more embodiments, a method for processing a guest event in a hypervisor-controlled system is addressed exhibiting the advantage of protecting guest confidentiality. Thus, a method according to the invention generally describes securely managing virtual machines while maintaining privacy of virtual machine contents towards the hypervisor comprising one or more VMs each with resources including encrypted memory and context data, a hypervisor managing VM resources and VM states, CPU assisted virtualization enforcing restricted access of the hypervisor to VM state/memory/context through firmware services.

In one or more embodiments, a method according to the invention describes processing a guest event in a hypervisor-controlled system where guest data is encrypted with a guest key not accessible to the hypervisor and where CPUs and firmware are considered trusted and have access to the guest key when running in guest context. The firmware in this context particularly means system software implemented in a hardware based environment.

As noted, a the method according to one or more aspects of the present invention describes running virtual machines from memory encrypted for a virtual machine. The method prevents that a hypervisor can always fully inspect its guests, i.e. virtual machines/images, and read memory contents with potentially sensitive data. An advantage is that the described method does not use processes like authentication of a trust anchor with a (customer) key service, or re-encryption of a VM image (using a second key) when loading the encrypted image from disk to memory. It does not need the usage of a plain counter (CTR) mode encryption being insecure, instead it describes the usage of a variant of a CTR mode encryption like an Xor-encrypt-xor (XEX)-based tweaked-codebook mode with ciphertext stealing (XTS) mode encryption to be secure. It is able to deal with interrupts or hypervisor intercepts. The method is able to secure non-encrypted cache contents from a non-authorized access and is able to handle I/O. Further, the described method does not require an attestation module (e.g. a TPM) on the CPU.

Advantageously, particularly for extending a virtualized environment of CPU architectures, the method may further comprise (i) decrypting or encrypting the guest memory by a CPU, if the CPU runs in guest context; (ii) allowing the guest to communicate externally through a non-encrypted memory range; (iii) paging encrypted pages of the guest memory by the hypervisor. A virtualization mechanism of CPU architectures may be extended, so that a memory of guests is always encrypted. This may be done during processing by the CPU, and prevents the hypervisor from reading the memory or registering contents in clear text. For efficient processing, the cache may be unencrypted. However when data of a guest leaves the CPU, the content may be encrypted. Decryption of the guest memory during guest execution may take place transparently through the CPU, but only as the CPU is running the guest context.

Further, particularly for a secure deployment and execution of a virtual machine, the method may advantageously comprise (i) providing the guest with the guest key being encrypted with the public key associated with a private key of the CPU for transfer to the key store of the CPU; (ii) providing the CPU with the private key, being stored in the CPU and being used to decrypt the encrypted guest key; (iii) the guest key being used to encrypt and decrypt the guest memory while running guest or firmware code in guest context by the CPU. Thus, a secure deployment and execution of a virtual machine in a hypervisor-controlled system may be enabled.

Each CPU may get a key pair; its private key may be stored in the CPU only, and may be used to decrypt guest keys. The CPU public key may be used to encrypt (and transfer) the private guest key to the CPU, in which the guest key may be stored and used securely.

The guest may generate a key as well. The guest key may be encrypted with the CPU public key before it is transferred to the CPU. The CPU may use this guest key to encrypt the guest's memory (but only when running the guest in the context of the CPU virtualization function). The guest key may also be used to deploy images from the guest in a Cloud environment.

Favorably, particularly for boot image generation and deployment, the method according to the invention may further comprise (i) generating a boot image by a client or customer; (ii) encrypting the boot image with the guest key; (iii) transferring the encrypted boot image to a boot disk; (iv) loading the encrypted boot image of a guest by the hypervisor to the guest memory; (v) starting an execution of a guest as a virtual machine at the CPU level, where the guest is defined by an area of an encrypted memory, an area of an unencrypted memory and an encrypted guest key. The guest key may be known only to the client and the guest respectively and the CPU in guest context, and for the transport to the CPU the guest key may be encrypted with the public key associated with the private key of the CPU. It need not be known to a Cloud operator or the hypervisor. The guest key may be encrypted for one or more systems or CPUs.

Advantageously, particularly for a boot process of the boot image, the method may further comprise (i) decrypting a thread of execution in the virtual machine executing on the boot image to clear text when the CPU is in guest context; (ii) decrypting the guest memory while the CPU is in guest context and the guest state, both being protected from access by the hypervisor or other guests. The hypervisor may read contents of the boot image from the boot disk into the guest memory without relocation, where the boot disk contents may comprise a kernel, parameters, an initial ram disk. Loading the boot image may also comprise mounting a conventionally encrypted (e.g. via dm-crypt, a usually applied LINUX encrypting tool) root file system. Further the boot disk contents may comprise a kernel execution (kexec) environment that loads a new kernel from a conventionally encrypted target boot device.

Favorably, particularly for an execution of a virtual machine, the method may comprise (i) extending a virtualization function of the CPU to encrypt the guest memory when the encrypted area of the guest memory is written to in guest context; (ii) decrypting the guest memory when the encrypted area of a guest memory is read from in guest context; (iii) keeping the encrypted area of the guest memory and guest registers being accessible to the hypervisor only in encrypted form. The CPU architecture may be extended to provide a well-defined means to access a guest state, where access methods may provide the hypervisor only with the necessary information to perform its tasks (e.g. handling traps). However, the guest memory and register file may not be accessible outside of the access methods. Thus, confidentiality of the guest may be protected, since the hypervisor cannot read a guest state or guest data entirely. The register file may not be accessible to the hypervisor directly, but may be stored away and restored through a hypervisor service. Other contexts than the guest itself may only see encrypted memory contents, as the hypervisor may not see the unencrypted guest memory. An area of the guest memory may remain unencrypted in order to exchange data with the hypervisor or I/O devices. An I/O scratch area may be outside the encrypted memory area.

In an advantageous embodiment, particularly for an interaction between the virtual machine and the hypervisor, the method may further comprise (i) keeping the encrypted range of the guest memory or registers associated with the guest event being not accessible to the hypervisor in decrypted form; (ii) extending the virtualization function of the CPU by access methods to specific guest data associated with the guest event. This step may be advantageous for a hypervisor operation, but may not reveal data or code (other than reason and relevant parameters for instructions that trap) of the guest and enable to continue execution of the guest event. Some traps may be disabled entirely since they may only be meaningful (for example, single stepping), when a hypervisor has full access to a guest.

Advantageously, particularly for an I/O process of a guest, the method may further comprise (i) defining a non-encrypted memory area for I/O buffers and I/O control structures of the guest outside the encrypted area of the guest memory; (ii) starting the I/O process by the guest using that non-encrypted area of the guest memory; (iii) the virtualization function of the CPU generating a guest event; (iv) the hypervisor reading a reason for the guest event and performing the I/O process. By putting the I/O buffers outside the encrypted guest memory, the hypervisor and I/O devices may have access to I/O control structures and data.

Favorably, particularly for a paging process by the hypervisor, the method may further comprise (i) paging-out pages of the guest memory by the hypervisor; (ii) upon attempting access to a paged-out page, providing a page fault that indicates to the hypervisor whether a page-out operation of the hypervisor caused that page fault; (iii) triggering the hypervisor to perform a page-in process to the guest memory. The hypervisor may store the pages on a hypervisor owned swap device, where still the page contents may be encrypted. The CPU's virtualization function may trap, where the hypervisor may read a reason for the trap (e.g. "page fault") and may read a guest address. Then, the hypervisor may put the page back to the same guest address, which maintains guest data integrity when encryption results are kept non-relocatable. Then the hypervisor may restart the guest.

In an advantageous embodiment, particularly for establishing trust in the described method, the method may further comprise checking a guest integrity with a checking process that knows the guest key, the checking process comprising (i) the guest reading a memory content in clear text from the guest memory transferring an arbitrary range of the guest memory via a secure communication path to the checking process; (ii) requesting the same memory range of the guest memory from the hypervisor and transferring it to the checking process; (iii) comparing the memory content obtained from the guest with the result of decrypting the memory content obtained from the hypervisor; (iv) delivering a comparison result depending on the contents of the two memory ranges; (v) returning the result of the checking process being positive if the comparison result equals zero, otherwise being negative. These method steps may be especially advantageous because the hypervisor is not able to read/inject code or data since it is not provided with the key for guest memory decryption/encryption.

According to a further advantageous aspect of the invention a data processing program for execution in a data processing system is proposed comprising an implementation of an instruction set for performing a method as described above when the data processing program is run on a computer.

Further a favorable computer program product is proposed comprising a computer usable medium including a computer readable program, wherein the computer readable program when executed on a computer causes the computer to perform a method for processing a guest event in a hypervisor-controlled system, comprising: (i) the guest event triggering a first firmware service being specific for the guest event in a firmware, the guest event being associated with a guest and with a guest state and a guest memory encrypted with a guest key; (ii) the firmware processing information associated with the guest event, comprising information of the guest state and the guest memory, and presenting only a subset of the information of the guest state and the guest memory in decrypted form to a hypervisor, wherein the subset of the information is selected to suffice for the hypervisor to process the guest event; (iii) the firmware retaining a part of the information of the guest state and the guest memory that is not being sent to the hypervisor; (iv) the hypervisor processing the guest event based on the received subset of the information of the guest state and the guest memory and sending a process result to the firmware triggering a second firmware service being specific for the guest event; (v) the firmware processing the received process result together with the part of the information of the guest state and the guest memory that was not sent to the hypervisor, generating a state and/or memory modification; (vi) the firmware performing the state and/or memory modification associated with the guest event at the guest memory in encrypted form.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system. "

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is disclosed, comprising software code portions for performing a method described above.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A method of processing a guest event in a hypervisor-controlled system, the method comprising:
triggering, based on the guest event, a first firmware service, the first firmware service being specific for the guest event in a firmware, the guest event being associated with a guest and with a guest state and a guest memory encrypted with a guest key;

processing, by the firmware, information associated with the guest event, the information comprising information of the guest state and the guest memory, and presenting only a subset of the information of the guest state and the guest memory in decrypted form to a hypervisor, wherein the subset of the information is selected to suffice for the hypervisor to process the guest event;

retaining, by the firmware, a part of the information of the guest state and the guest memory that is not being sent to the hypervisor;

processing, by the hypervisor, the guest event based on the received subset of the information of the guest state and the guest memory and sending a process result to the firmware triggering a second firmware service, the second firmware service being specific for the guest event;

processing, by the firmware, the received process result together with the part of the information of the guest state and the guest memory that was not sent to the hypervisor to generate a state or memory modification; and performing, by the firmware, the state or memory modification associated with the guest event at the guest memory in encrypted form.

2. The method of claim 1, further comprising:
decrypting or encrypting the guest memory by a CPU, if the CPU runs in guest context;
allowing the guest to communicate externally through a non-encrypted memory range; and
paging encrypted pages of the guest memory by the hypervisor.

3. The method of claim 1, further comprising:
providing the guest with the guest key encrypted with the public key associated with a private key of a CPU for transfer to a key store of the CPU;
providing the CPU with the private key, the private key being stored in the CPU and being used to decrypt the encrypted guest key; and
the guest key being used to encrypt and decrypt the guest memory while running guest or firmware code in guest context by the CPU.

4. The method of claim 1, further comprising:
generating a boot image by a client;
encrypting the boot image with the guest key;
transferring the encrypted boot image to a boot disk;
loading the encrypted boot image of a guest by the hypervisor to the guest memory; and
starting an execution of a guest as a virtual machine at a CPU level.

5. The method of claim 4, further comprising:
decrypting a thread of execution in the virtual machine executing on the guest memory to clear text while the CPU is in guest context; and
decrypting the guest memory while the CPU is in guest context and the guest state, both being protected from access by the hypervisor or other guests.

6. The method of claim 1, further comprising:
extending a virtualization function of a CPU to encrypt the guest memory when an encrypted area of the guest memory is written to in guest context;
decrypting the guest memory when the encrypted area of a guest memory is read from in guest context; and
keeping the encrypted area of the guest memory and guest registers being accessible to the hypervisor only in encrypted form.

7. The method of claim 1, further comprising:
keeping the encrypted range of the guest memory or registers associated with the guest event not accessible to the hypervisor in decrypted form; and
extending the virtualization function of a CPU by access methods to specific guest data associated with the guest event.

8. The method of claim 1, further comprising:
defining a non-encrypted memory area for I/O buffers and I/O control structures of the guest outside an encrypted area of the guest memory;
starting an I/O process by the guest using that non-encrypted area of the guest memory;
a virtualization function of a CPU generating a guest event; and
the hypervisor reading a reason for the guest event and performing the I/O process.

9. The method of claim 1, further comprising:
paging-out pages of the guest memory by the hypervisor;
upon attempting access to a paged-out page, providing a page fault that indicates to the hypervisor whether a page-out operation of the hypervisor caused that page fault; and
triggering the hypervisor to perform a page-in process to the guest memory.

10. The method of claim 1, further comprising checking a guest integrity with a checking process that knows the guest key, the checking process comprising:
the guest reading a memory content in clear text from the guest memory transferring an arbitrary range of the guest memory via a secure communication path to the checking process;
requesting the same memory range of the guest memory from the hypervisor and transferring it to the checking process;
comparing the memory content obtained from the guest with the result of decrypting the memory content obtained from the hypervisor;
delivering a comparison result depending on the contents of the two memory ranges; and
returning a result of the checking process that is positive if the comparison result equals zero, otherwise that is negative.

11. A system for processing a guest event in a hypervisor-controlled system, the system comprising:
a memory; and
a processor communicatively coupled to the memory, wherein the system performs a method comprising:
triggering, based on the guest event, a first firmware service, the first firmware service being specific for the guest event in a firmware, the guest event being associated with a guest and with a guest state and a guest memory encrypted with a guest key;
processing, by the firmware, information associated with the guest event, the information comprising information of the guest state and the guest memory, and presenting only a subset of the information of the guest state and the guest memory in decrypted form to a hypervisor, wherein the subset of the information is selected to suffice for the hypervisor to process the guest event;
retaining, by the firmware, a part of the information of the guest state and the guest memory that is not being sent to the hypervisor;
processing, by the hypervisor, the guest event based on the received subset of the information of the guest state and the guest memory and sending a process result to the firmware triggering a second firmware service, the second firmware service being specific for the guest event;

processing, by the firmware, the received process result together with the part of the information of the guest state and the guest memory that was not sent to the hypervisor to generate a state or memory modification; and performing, by the firmware, the state or memory modification associated with the guest event at the guest memory in encrypted form.

12. The system of claim 11, wherein the system further performs:

decrypting or encrypting the guest memory by a CPU, if the CPU runs in guest context;

allowing the guest to communicate externally through a non-encrypted memory range; and paging encrypted pages of the guest memory by the hypervisor.

13. The system of claim 11, wherein the system further performs:

providing the guest with the guest key encrypted with the public key associated with a private key of a CPU for transfer to a key store of the CPU;

providing the CPU with the private key, the private key being stored in the CPU and being used to decrypt the encrypted guest key; and the guest key being used to encrypt and decrypt the guest memory while running guest or firmware code in guest context by the CPU.

14. The system of claim 11, wherein the system further performs:

generating a boot image by a client;

encrypting the boot image with the guest key;

transferring the encrypted boot image to a boot disk;

loading the encrypted boot image of a guest by the hypervisor to the guest memory; and starting an execution of a guest as a virtual machine at a CPU level.

15. The system of claim 11, wherein the system further performs:

extending a virtualization function of a CPU to encrypt the guest memory when an encrypted area of the guest memory is written to in guest context;

decrypting the guest memory when the encrypted area of a guest memory is read from in guest context; and keeping the encrypted area of the guest memory and guest registers being accessible to the hypervisor only in encrypted form.

16. The system of claim 11, wherein the system further performs:

keeping the encrypted range of the guest memory or registers associated with the guest event not accessible to the hypervisor in decrypted form; and extending the virtualization function of a CPU by access methods to specific guest data associated with the guest event.

17. The system of claim 11, wherein the system further performs:

defining a non-encrypted memory area for I/O buffers and I/O control structures of the guest outside an encrypted area of the guest memory;

starting an I/O process by the guest using that non-encrypted area of the guest memory;

a virtualization function of a CPU generating a guest event; and the hypervisor reading a reason for the guest event and performing the I/O process.

18. The system of claim 11, wherein the system further performs:

paging-out pages of the guest memory by the hypervisor;

upon attempting access to a paged-out page, providing a page fault that indicates to the hypervisor whether a page-out operation of the hypervisor caused that page fault; and triggering the hypervisor to perform a page-in process to the guest memory.

19. The system of claim 11, wherein the system further performs:

checking a guest integrity with a checking process that knows the guest key, the checking process comprising:

the guest reading a memory content in clear text from the guest memory transferring an arbitrary range of the guest memory via a secure communication path to the checking process;

requesting the same memory range of the guest memory from the hypervisor and transferring it to the checking process;

comparing the memory content obtained from the guest with the result of decrypting the memory content obtained from the hypervisor;

delivering a comparison result depending on the contents of the two memory ranges; and returning a result of the checking process that is positive if the comparison result equals zero, otherwise that is negative.

20. A computer program product for processing a guest event in a hypervisor-controlled system, the computer program product comprising:

a non-transitory computer-readable storage medium having program instructions embodied therewith, the program instructions being executable by a processor to cause the processor to perform a method comprising:

triggering, based on the guest event, a first firmware service, the first firmware service being specific for the guest event in a firmware, the guest event being associated with a guest and with a guest state and a guest memory encrypted with a guest key;

processing, by the firmware, information associated with the guest event, the information comprising information of the guest state and the guest memory, and presenting only a subset of the information of the guest state and the guest memory in decrypted form to a hypervisor, wherein the subset of the information is selected to suffice for the hypervisor to process the guest event;

retaining, by the firmware, a part of the information of the guest state and the guest memory that is not being sent to the hypervisor;

processing, by the hypervisor, the guest event based on the received subset of the information of the guest state and the guest memory and sending a process result to the firmware triggering a second firmware service, the second firmware service being specific for the guest event;

processing, by the firmware, the received process result together with the part of the information of the guest state and the guest memory that was not sent to the hypervisor to generate a state or memory modification; and performing, by the firmware, the state or memory modification associated with the guest event at the guest memory in encrypted form.

* * * * *